US012663143B1

(12) United States Patent
Chen

(10) Patent No.: US 12,663,143 B1
(45) Date of Patent: Jun. 23, 2026

(54) SERIAL-TYPE LIGHT STRING AND INSTALLATION METHOD

(71) Applicant: Hunan Zhida Technology Co., Ltd., Chenzhou (CN)

(72) Inventor: Li Chen, Chenzhou (CN)

(73) Assignee: Hunan Zhida Technology Co., Ltd., Chenzhou (CN)

( * ) Notice: Subject to any disclaimer, the term of this patent is extended or adjusted under 35 U.S.C. 154(b) by 0 days.

(21) Appl. No.: 19/339,829

(22) Filed: Sep. 25, 2025

(30) Foreign Application Priority Data

Aug. 11, 2025 (CN) .......................... 202511116185.7

(51) Int. Cl.
*F21S 4/10* (2016.01)
*F21V 19/00* (2006.01)
*F21V 23/00* (2015.01)
*F21Y 115/10* (2016.01)

(52) U.S. Cl.
CPC ............ *F21V 19/0025* (2013.01); *F21S 4/10* (2016.01); *F21V 23/002* (2013.01); *F21Y 2115/10* (2016.08)

(58) Field of Classification Search
CPC .. F21V 23/001; F21V 23/002; F21V 19/0025; F21Y 2115/10; H01R 12/67; H01R 12/675; F21S 4/00; F21S 4/10; F21S 4/15; F21S 4/20; F21S 4/22; F21S 4/24; F21S 4/26; F21S 4/28
USPC .................................................... 362/249.02
See application file for complete search history.

(56) References Cited

U.S. PATENT DOCUMENTS 5,829,865 A * 11/1998 Ahroni ...................... F21S 4/10 362/657
10,914,437 B1 * 2/2021 Shao .................... G02B 6/0005
2009/0186516 A1 * 7/2009 Nall ...................... F21V 23/002 439/417

* cited by examiner

*Primary Examiner* — Robert J May
(74) *Attorney, Agent, or Firm* — AVEK IP, LLC

(57) ABSTRACT

Some embodiments of the disclosure provide a serial-type light string and an installation method. The serial-type light string includes: a wire group including a positive wire, a negative wire and a connecting wire provided with a plurality of disconnecting holes; and a plurality of light-emitting assemblies arranged in one-to-one correspondence with the disconnecting holes. Each of the light-emitting assemblies includes a lamp holder and a lamp base, the lamp holder is provided with a first conductive member and a second conductive member arranged spaced apart in a circumferential direction of the lamp holder, one end of each of the first conductive member and the second conductive member is disposed within the lamp holder to be in conduction with the lamp base, and ends of the first conductive member and the second conductive member away from the lamp base are configured to be in conduction with the connecting wire.

10 Claims, 7 Drawing Sheets

SERIAL-TYPE LIGHT STRING AND INSTALLATION METHOD

CROSS REFERENCE TO RELATED APPLICATIONS

This application claims priority to Chinese patent application No. 2025111161857 filed Aug. 11, 2025, the disclosure of which is incorporated by reference herein in its entirety.

FIELD OF THE DISCLOSURE

The present disclosure relates to the technical field of lighting equipment, and in particular, to a serial-type light string and an installation method applied to the serial-type light string.

BACKGROUND

In the technical field of lighting equipment, light strings, as a common decorative and lighting tool, are widely used in various scenarios such as festival celebration, interior decoration, and outdoor landscapes. Traditional light strings mainly use a parallel structure in their circuit connection. Although each bulb may work independently and the damage of one bulb usually does not affect the normal lighting of other bulbs, a parallel circuit requires a relatively large voltage to drive all the bulbs and has poor adaptability to low-voltage power supplies. When using the low-voltage power supplies, such as 3-5V, parallel light strings often do not work normally or require additional boost equipment, which not only increases cost and complexity but also makes them difficult to apply in some scenarios with strict power requirements. In addition, the parallel light strings have large line loss and relatively low power transmission efficiency when connected over long distances, which is not conducive to the infinite continuation and elongation of the light strings, limiting their application scope in large-scale decorative scenarios.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

The present disclosure aims to solve at least one of the technical problems existing in the existing technologies. To this end, a serial-type light string is proposed. Due to a three-wire structure, a light-emitting position may be freely selected to drill the disconnecting holes, thus confirming the installation positions of the light-emitting assemblies. A pressing cover assists in fixing, making the connection stable and reliable, and reducing poor contact. In addition, the three-wire structure achieves infinite continuation and elongation in cooperation with a continuation seat, takes into account voltage adaptation and long-distance flexible application, and is especially suitable for the lighting use of 3-5V low-voltage LED bulbs.

The present disclosure further provides an installation method applied to the above-mentioned serial-type light string.

According to the present disclosure, a serial-type light string may include:

- a wire group including a positive wire, a negative wire and a connecting wire, where one end of the connecting wire is in conduction with the positive wire and the other end of the connecting wire is in conduction with the negative wire, and the connecting wire is provided with a plurality of disconnecting holes; and
- a plurality of light-emitting assemblies connected to the wire group and arranged in one-to-one correspondence with the disconnecting holes, where each of the light-emitting assemblies may include a lamp holder and a lamp base, the lamp holder is provided with a first conductive member and a second conductive member that are arranged spaced apart in a circumferential direction of the lamp holder, one end of each of the first conductive member and the second conductive member is disposed within the lamp holder to be in conduction with the lamp base, and another end of each of the first conductive member and the second conductive member protrudes from the lamp holder;
- where the first conductive member and the second conductive member are located respectively on opposite sides of the respective disconnecting hole, and ends of the first conductive member and the second conductive member away from the lamp base may be inserted into the connecting wire and in conduction with the connecting wire.

According to the present disclosure, the serial-type light string has at least the following beneficial effects: by means of a unique three-wire connection design, the positive wire, the negative wire and the connecting wire of which both ends are in conduction with the positive wire and the negative wire are integrated into the wire group. Furthermore, the connecting wire is provided with a plurality of disconnecting holes, the installation positions of the plurality of light-emitting assemblies are confirmed, the light-emitting assemblies are then in conduction with the lamp base through the first conductive member and the second conductive member arranged circumferentially within the lamp holder, respectively, and protruding ends of the first conductive member and the second conductive member are inserted into the connecting wire in a manner of corresponding to both sides of each of the disconnecting holes, to achieve an electrical connection. This structure enables each light-emitting assembly to be stably accessed into a circuit in a serial manner, which not only simplifies the complex soldering or plug-in process of traditional light strings but also ensures reliable power supply for LED bulbs at low voltages such as 3-5V. In addition, in cooperation with a conduction method of directly inserting the connecting wire, the design of the first conductive member and the second conductive member being located respectively on opposite sides of the respective disconnecting hole achieves efficient current transmission and reduces line loss, such that the light string may flexibly achieve long-distance continuation or single-component maintenance while ensuring low-voltage adaptation. With a compact overall structure and a clear conductive path, the installation convenience, power supply stability and use flexibility of the light string are significantly improved.

According to the serial-type light string in some embodiments of the present disclosure, the lamp base is provided with an insulating post, a first conductive ring and a second conductive ring, the first conductive ring and the second conductive ring are arranged spaced apart in an axial direction of the insulating post, and the insulating post is threadedly connected to the lamp holder, to cause the first conductive ring to contact and be in conduction with the first conductive member, and to cause the second conductive ring to contact and be in conduction with the second conductive member.

According to the serial-type light string in some embodiments of the present disclosure, the first conductive ring is located at a bottom of the insulating post, the second conductive ring is located at a top of the insulating post, an outer diameter of the first conductive ring is smaller than an outer diameter of the second conductive ring, the first conductive member and the second conductive member are both strip-shaped and arranged in parallel, the first conductive member abuts against and is in conduction with an outer wall of the first conductive ring, and the second conductive member abuts against and is in conduction with an outer wall of the second conductive ring.

According to the serial-type light string in some embodiments of the present disclosure, the lamp base is provided with a light-emitting source, the light-emitting source is connected to the positive lead wire and the negative lead wire, the insulating post is provided with a first wire duct and a second wire duct, the positive lead wire is threaded through the first wire duct, to be connected to the first conductive ring, and the negative lead wire is threaded through the second wire duct, to be connected to the second conductive ring.

According to the serial-type light string in some embodiments of the present disclosure, the positive wire, the connecting wire and the negative wire are arranged in sequence.

According to the serial-type light string in some embodiments of the present disclosure, the first conductive member and the second conductive member are both provided with piercing portions at ends away from the lamp base, to pierce the connecting wire.

According to the serial-type light string in some embodiments of the present disclosure, the lamp holder is connected to a pressing cover on one side away from the lamp base, to cause the first conductive member and the second conductive member to be pressed against the wire group.

According to the serial-type light string in some embodiments of the present disclosure, the pressing cover is snap-fitted with the lamp holder.

According to the serial-type light string in some embodiments of the present disclosure, the serial-type light string may further include a continuation seat, the wire group is provided in a plurality, and the plurality of wire groups are connected and in conduction through the continuation seat.

According to the present disclosure, an installation method is applied to the serial-type light string in the present disclosure, and the installation method may include the following steps:

- confirming positions: taking the wire group, and drilling a plurality of disconnecting holes in the connecting wire according to preset light-emitting positions;
- piercing and conducting: after the confirming positions, taking and arranging a plurality of light-emitting assemblies in one-to-one correspondence with the disconnecting holes, and inserting the first conductive member and the second conductive member of each light-emitting assembly into the connecting wire on both sides of the respective disconnecting hole, such that the first conductive member and the second conductive member are electrically and separately in conduction with the positive wire and the negative wire;
- fixing the lamp base: before or after the piercing and conducting, mounting the lamp base on the lamp holder to cause the lamp base to be electrically in conduction with the first conductive member and the second conductive member; and
- fixing the pressing cover: after the piercing and conducting, clamping the pressing cover on one side of the lamp holder away from the lamp base, and causing, by mechanical pressure, the first conductive member and the second conductive member to be pressed against the wire group.

According to the present disclosure, the installation method has at least the following beneficial effects: by means of the systematic steps of position confirmation, piercing and conduction, lamp base fixation and pressing cover fixation, efficient and reliable installation of the light string is achieved. In application, the disconnecting holes are first accurately drilled according to the preset light-emitting positions, to ensure the accuracy of the conductive connection position, and then the first conductive member and the second conductive member of the light-emitting assemblies are directly inserted into the connecting wire on both sides of the respective disconnecting hole to achieve electrical conduction, which simplifies the traditional soldering or complex plug-in process. In addition, the lamp base is in conduction with the conductive members through a threaded connection, which ensures the stable power supply of the light-emitting source, and finally the mechanical stability of the conductive connection is further enhanced by clamping and fixing with the pressing cover. The overall operation is simple, and both installation efficiency and connection reliability are taken into account, so the installation method is particularly suitable for the rapid deployment and maintenance of the light string in a low-voltage environment, thus improving the user experience and the engineering applicability of the light string.

Additional aspects and advantages of the present disclosure will be set forth in part in the description which follows and, in part, will be obvious from the description which follows, or may be learned by practice of the present disclosure.

BRIEF DESCRIPTION OF THE DRAWINGS

Illustrative embodiments of the present disclosure are described in detail below with reference to the attached drawing figures.

Figure 1:
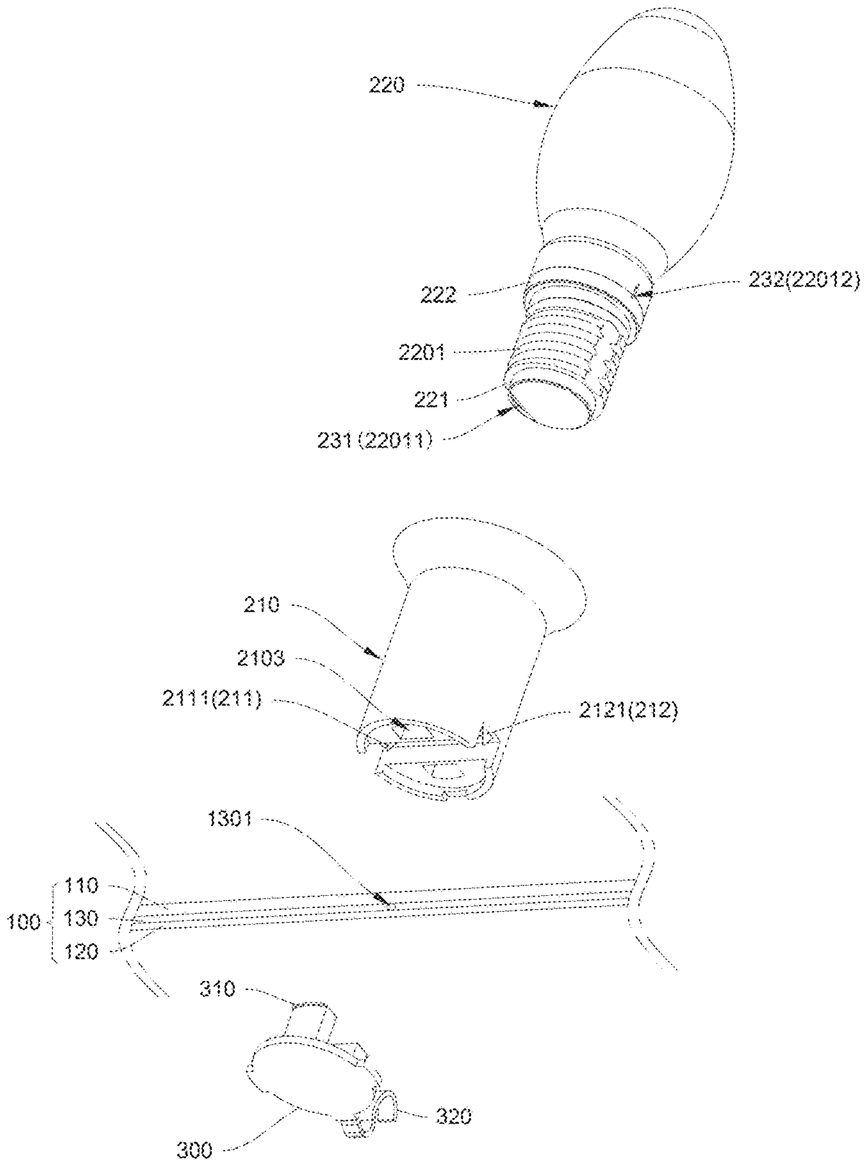
FIG. 1 is an exploded schematic diagram of a serial-type light string according to an embodiment of the present disclosure.
Figure 2:
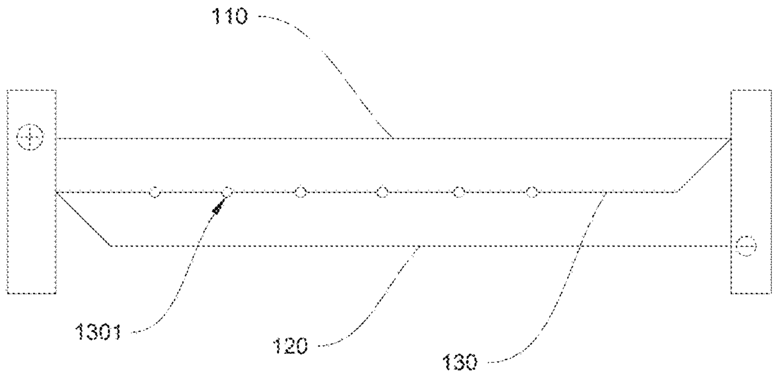
FIG. 2 is a schematic structural diagram of a wire group of a serial-type light string according to an embodiment of the present disclosure.
Figure 3:
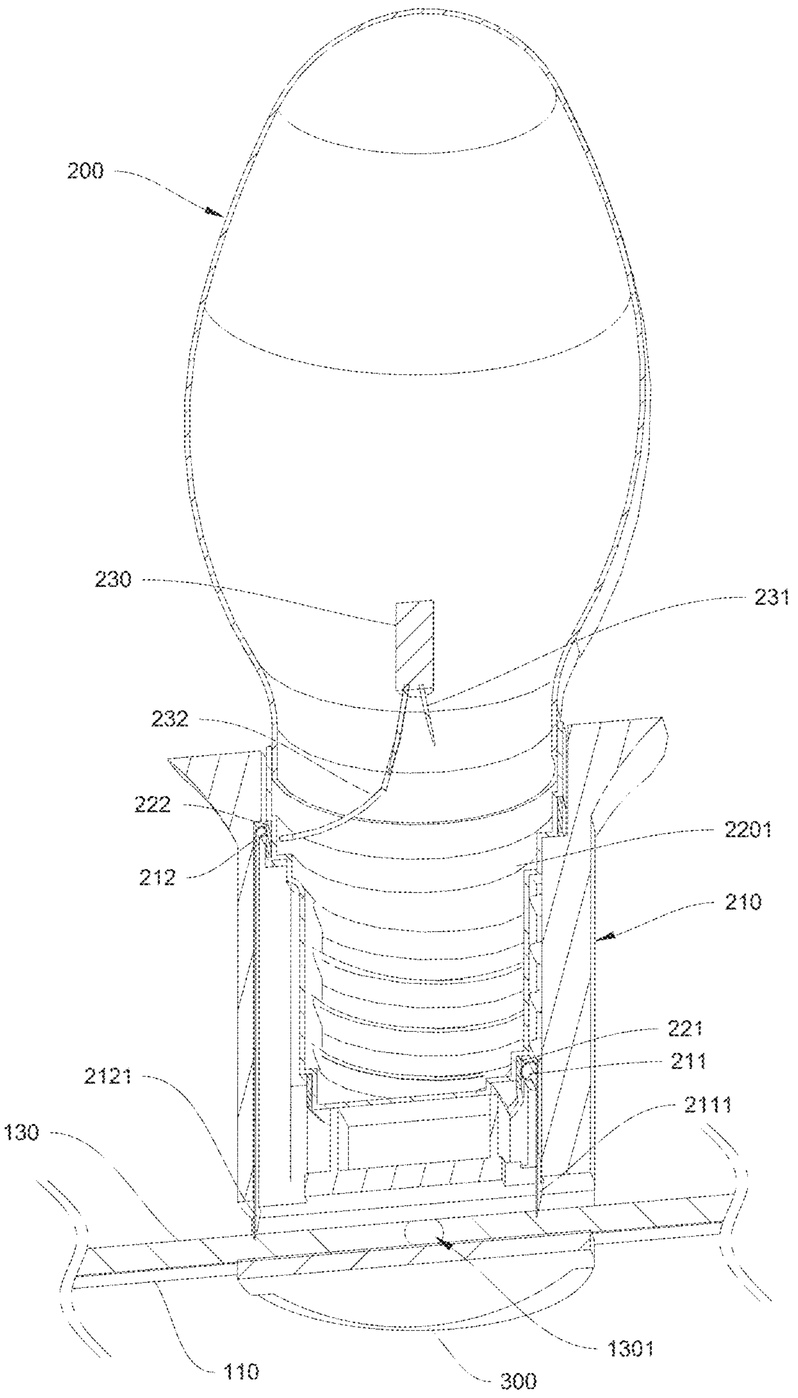
FIG. 3 is a cross-sectional schematic diagram I of a serial-type light string according to an embodiment of the present disclosure.
Figure 4:
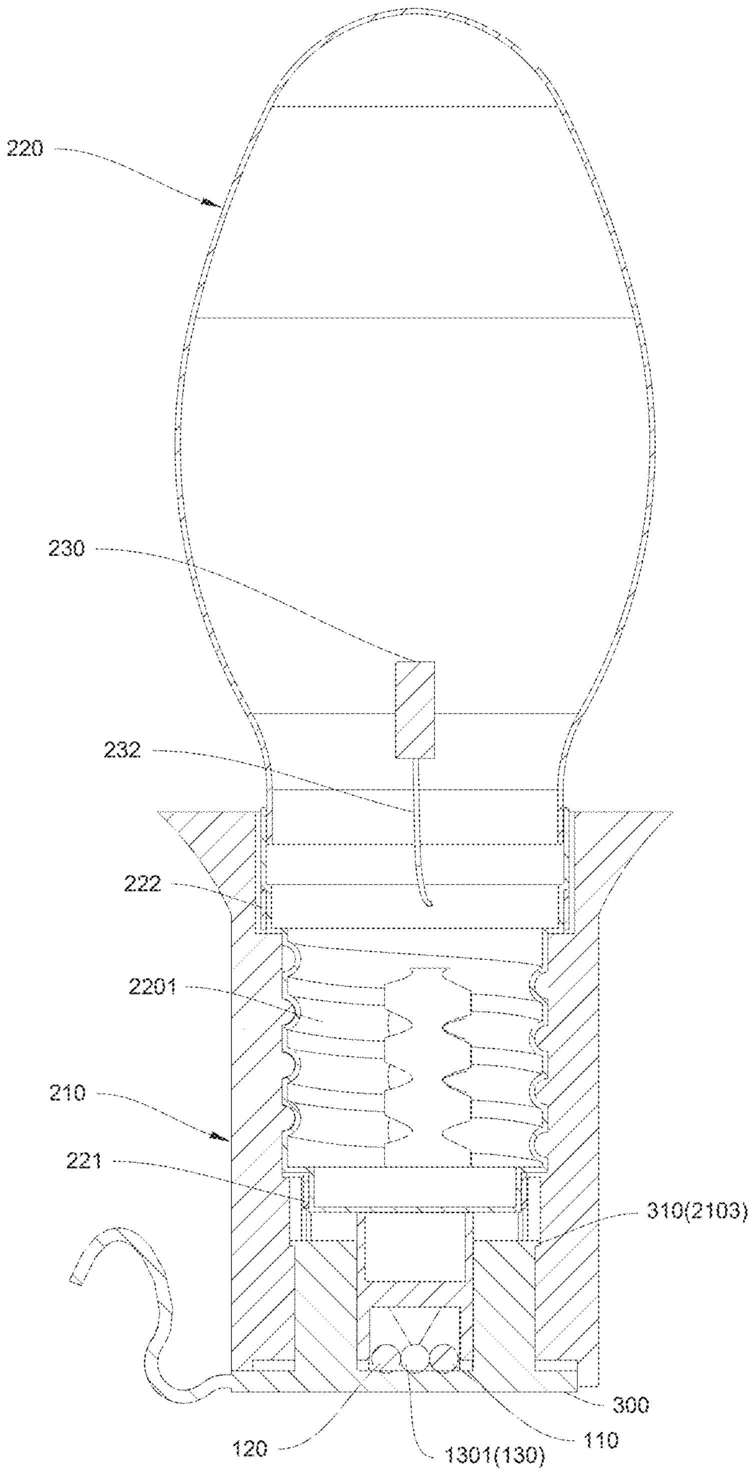
FIG. 4 is a cross-sectional schematic diagram II of a serial-type light string according to an embodiment of the present disclosure.
Figure 5:
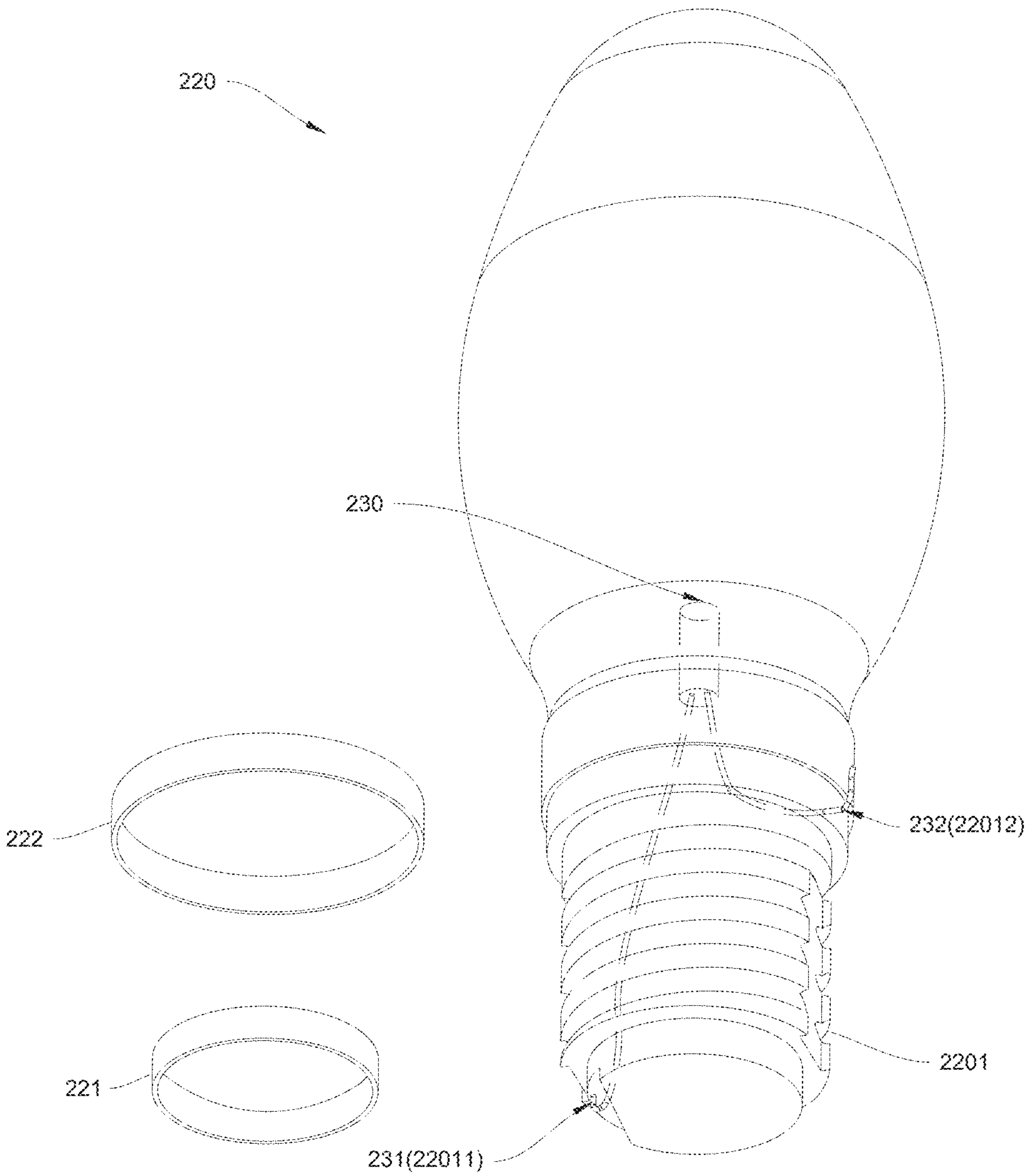
FIG. 5 is an exploded schematic diagram of a lamp base of a serial-type light string according to an embodiment of the present disclosure.
Figure 6:
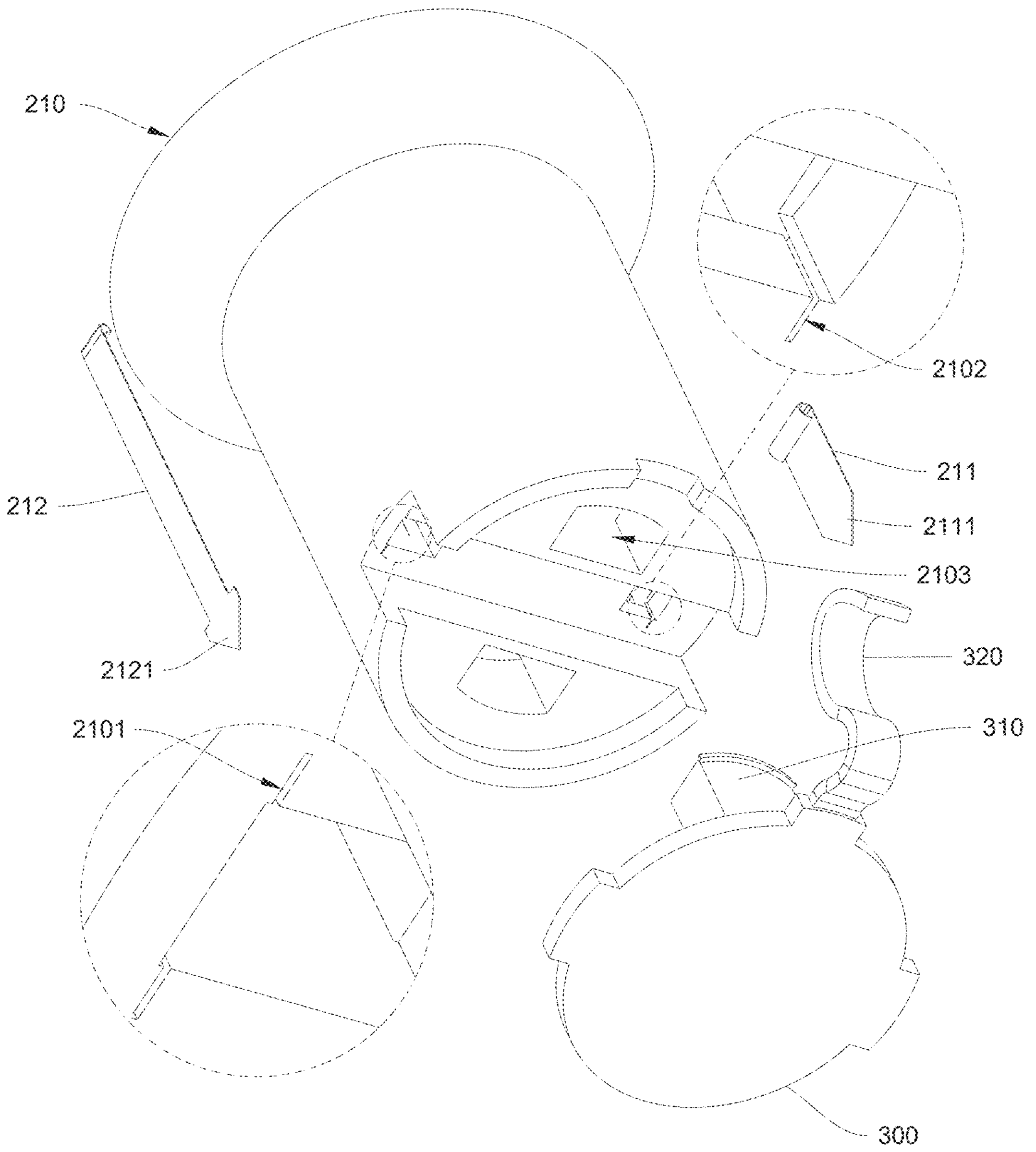
FIG. 6 is an exploded schematic diagram of a lamp holder and a pressing cover of a serial-type light string according to an embodiment of the present disclosure.

Description of reference numerals: wire group 100, positive wire 110, negative wire 120, connecting wire 130, disconnecting hole 1301, light-emitting assembly 200, lamp holder 210, first limiting slot 2101, second limiting slot 2102, clamping slot 2103, first conductive member 211, first piercing portion 2111, second conductive member 212, second piercing portion 2121, lamp base 220, insulating post 2201, first wire duct 22011, second wire duct 22012, first conductive ring 221, second conductive ring 222, light-emitting source 230, positive lead wire 231, negative lead wire 232, pressing cover 300, clamping portion 310, opening portion 320, continuation seat 400, and power supply plug 500.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

In the description of the present disclosure, it is understood that orientation or position relationships indicated by the terms "upper", "lower", "front", "rear", "left", and "right", and the like are based on the orientation or position relationships as shown in the accompanying drawings, for ease of describing the present disclosure and simplifying the description only, rather than indicating or implying that the mentioned apparatus or element necessarily has a particular orientation and must be constructed and operated in the particular orientation. Therefore, these terms should not be understood as limitations to the present disclosure.

In the description of the present disclosure, the meaning of "several" is one or more, the meaning of "a plurality" is more than two, "greater than", "less than", "exceeding" and the like are understood as excluding the specified number, and "above", "below", "within" and the like are understood as including the specified number. The described "first" and "second" are merely used for distinguishing technical features, instead of being understood as indicating or implying relative importance or impliedly indicating the quantity of the showed technical features or impliedly indicating the precedence relationship of the showed technical features.

In the description of the present disclosure, unless specific limitation otherwise, terms "set", "install", "connect" and the like should be generally understood. Those of ordinary skill in the art may reasonably determine the specific meaning of the terms in the present disclosure in combination with the specific contents of the technical solution.

In the description of the present disclosure, the description with reference to the terms such as "one embodiment", "some embodiments", "schematic embodiment", "example", "specific example", or "some examples" intends to be included in at least one embodiment or example of the present disclosure in combination with the specific characteristics, structures, materials or features of this embodiment or example. In this specification, the schematic expression of the above terms does not need for the same embodiment or example. Moreover, the described specific characteristics, structures, materials or features may be combined in one or more embodiments or examples in a suitable manner.

In the technical field of lighting equipment, light strings, as a common decorative and lighting tool, are widely used in various scenarios such as festival celebration, interior decoration, and outdoor landscapes. Traditional light strings mainly use a parallel structure in their circuit connection. Although each bulb may work independently and the damage of one bulb usually does not affect the normal lighting of other bulbs, a parallel circuit requires a relatively large voltage to drive all the bulbs and has poor adaptability to low-voltage power supplies. When using the low-voltage power supplies, such as 3-5V, parallel light strings often do not work normally or require additional boost equipment, which not only increases cost and complexity but also makes them difficult to apply in some scenarios with strict power requirements. In addition, the parallel light strings have large line loss and relatively low power transmission efficiency when connected over long distances, which is not conducive to the infinite continuation and elongation of the light strings, limiting their application scope in large-scale decorative scenarios.

To this end, as shown in FIGS. 1 to 6, which is a serial-type light string proposed by the present disclosure, including a wire group 100 and a plurality of light-emitting assemblies 200 connected to the wire group 100. The wire group 100 includes a positive wire 110, a negative wire 120 and a connecting wire 130, and both ends of the connecting wire 130 are in conduction with the positive wire 110 and the negative wire 120, respectively. Furthermore, the connecting wire 130 is provided with a plurality of disconnecting holes 1301, and the plurality of light-emitting assemblies 200 are arranged in one-to-one correspondence with the disconnecting holes 1301. In one embodiment, each of the light-emitting assemblies 200 includes a lamp holder 210 and a lamp base 220. The lamp holder 210 is provided with a first conductive member 211 and a second conductive member 212 that are arranged spaced apart from each other. For example, referring to the structure of a conventional copper-head lamp, the first conductive member is arranged at a bottom end of the lamp holder, corresponding to a live wire interface at the bottom end of the lamp base of the copper-head lamp, and the second conductive member is arranged on an inner peripheral wall of the lamp holder, corresponding to a zero line interface (not shown in the Figures) at a threaded portion of the lamp base of the copper-head lamp. For another example, the first conductive member 211 and the second conductive member 212 are arranged spaced apart in a circumferential direction of the lamp holder 210. In some applications, the lamp base is provided with an insulating post, a first conductive ring, and a second conductive ring. In this regard, the first conductive ring corresponds to the live wire interface, and the second conductive ring corresponds to the zero line interface, that is, the first conductive ring and the second conductive ring are arranged oppositely to each other in a radial direction of the insulating post (not shown in the Figures). In one embodiment, the first conductive ring and the second conductive ring are both semi-annular. When the first conductive ring and the second conductive ring are in a same horizontal plane, the central angles corresponding to the semi-annular first conductive ring and the semi-annular second conductive ring are less than 180°. When the first conductive ring and the second conductive ring are staggered, the central angles corresponding to the semi-circular first conductive ring and the semi-circular second conductive ring may be 1° to 359°, such that the lamp base may be inserted into the lamp holder in a direct insertion manner through the insulating post. After insertion, the first conductive member and the second conductive member in the lamp holder are electrically and separately connected to the first conductive ring and the second conductive ring (not shown in the Figures). In some applications of this embodiment, the first conductive ring 221 and the second conductive ring 222 are arranged spaced apart in an axial direction of the insulating post 2201, and the insulating post 2201 is threadedly connected to the lamp holder 210, to cause the first conductive ring 221 to contact and be in conduction with the first conductive member 211, and to cause the second conductive ring 222 to contact and be in conduction with the second conductive member 212, thereby achieving a reliable electrical connection between the light-emitting assemblies 200 and the first conductive member 211 and the second conductive member 212 of the lamp holder 210. It could be understood that the axially spaced arrangement of the insulating post 2201 ensures the electrical isolation of the first conductive ring 221 and the second conductive ring 222. The threaded connection structure automatically causes the first conductive ring 221 to tightly contact and be in conduction with the first conductive member 211 and causes the second conductive ring 222 to tightly contact and be in conduction with the second conductive member 212, which not only simplifies the assembly process of the lamp base 220 and the lamp holder 210, but also ensures the mechanical stability of the connection through the self-locking characteristics of the thread, effectively resists loosening caused by vibration or external force, ensures the stable transmission of the low-voltage current from the conductive members of the lamp holder 210 to the light-emitting source 230 through the conductive rings, and improves the overall electrical connection reliability and safety of use. Further, one end of each of the first conductive member 211 and the second conductive member 212 is disposed within the lamp holder 210 to be in conduction with the lamp base 220, and another end of each of the first conductive member 211 and the second conductive member 212 protrudes from the lamp holder 210. In application, the first conductive member 211 and the second conductive member 212 are located respectively on opposite sides of the respective disconnecting hole 1301, and ends of the first conductive member 211 and the second conductive member 212 away from the lamp base 220 may be inserted into the connecting wire 130 and be in conduction with the connecting wire 130. It should be noted that, through a unique three-wire connection design, the positive wire 110, the negative wire 120 and the connecting wire 130 of which both ends are in conduction with the positive wire 110 and the negative wire 120 are integrated into the wire group 100. Furthermore, the connecting wire 130 is provided with a plurality of disconnecting holes 1301, the installation positions of the plurality of light-emitting assemblies 200 are confirmed, the light-emitting assemblies 200 are then in conduction with the lamp base 220 through the first conductive member 211 and the second conductive member 212 arranged circumferentially within the lamp holder 210, respectively, and protruding ends of the first conductive member 211 and the second conductive member 212 are inserted into the connecting wire 130 in a manner of corresponding to both sides of each of the disconnecting holes 1301, to achieve an electrical connection. This structure enables each light-emitting assembly 200 to be stably accessed into a circuit in a serial manner, which not only simplifies the complex soldering or plug-in process of traditional light strings but also ensures reliable power supply for LED bulbs at low voltages such as 3-5V. In addition, in cooperation with a conduction method of directly inserting the connecting wire 130, the design of the first conductive member 211 and the second conductive member 212 are located respectively on opposite sides of the respective disconnecting hole 1301 achieves efficient current transmission and reduces line loss, such that the light string may flexibly achieve long-distance continuation or single-component maintenance while ensuring low-voltage adaptation. With a compact overall structure and a clear conductive path, the installation convenience, power supply stability and use flexibility of the light string are significantly improved.

Referring to FIGS. 3, 5 and 6 again, in some embodiments of the present disclosure, the first conductive ring 221 is located at a bottom of the insulating post 2201, the second conductive ring 222 is located at a top of the insulating post 2201, and an outer diameter of the first conductive ring 221 is smaller than an outer diameter of the second conductive ring 222. Correspondingly, the first conductive member 211 and the second conductive member 212 are both strip-shaped and arranged in parallel. The first conductive member 211 abuts against and is in conduction with an outer wall of the first conductive ring 221, and the second conductive member 212 abuts against and is in conduction with an outer wall of the second conductive ring 222. It should be noted that the axial spacing and radial size differences of the insulating post 2201 ensure clear separation and stable contact of positive and negative conductive paths, thus avoiding the risk of positive and negative short circuit. At the same time, the parallel and strip conductive members reduce contact resistance, improve current transmission efficiency, and have a large contact conduction area with the outer walls of the conductive rings, thus further enhancing the power supply stability and consistency of the light-emitting effect of the light-emitting assemblies 200. Further referring to FIGS. 3 and 5, in some embodiments of the present disclosure, a light-emitting source 230 as well as a positive lead wire 231 and a negative lead wire 232 that are connected to the light-emitting source 230 are arranged in the lamp base 220, and a first wire duct 22011 and a second wire duct 22012 are provided on the insulating post 2201, to achieve a precise electrical connection of the light-emitting source 230 and the conductive rings. The structure in which the positive lead wire 231 is connected to the first conductive ring 221 through the first wire duct 22011 and the negative lead wire 232 is connected to the second conductive ring 222 through the second wire duct 22012 ensures a clear and definite directional transmission path of the current from the conductive rings to the light-emitting source 230, and avoids circuit failures caused by cross interference or incorrect connection of the leads. At the same time, the design of the wire ducts also provides physical fixation and direction guidance for the leads, thereby enhancing the mechanical stability of the connection between the light-emitting source 230 and the conductive rings, preventing the leads from loosening due to pulling or vibration, improving the reliability of the electrical connection inside the lamp base 220, and ensuring the stable illumination of the light-emitting source 230 such as the LED bulb and the long life of the lamp string. In some applications, when the first conductive ring 221 is sleeved on an outer periphery of the insulating post 2201, the positive lead wire 231 may be pressed against the outer surface of the insulating post 2201; and when the second conductive ring 222 is sleeved on the outer periphery of the insulating post 2201, the negative lead wire 232 may be pressed against the outer surface of the insulating post 2201;

Referring to FIGS. 3, 4 and 6 again, in some embodiments of the present disclosure, the first conductive member 211 and the second conductive member 212 are both provided with piercing portions at ends away from the lamp base 220, to pierce the connecting wire 130. In one embodiment, the piercing portions are a first piercing portion 2111 provided on the first conductive member 211 and a second piercing portion 2121 provided on the second conductive member 212. Thus, when the light-emitting assemblies 200 are installed, the piercing portions may directly penetrate through the insulating outer skin of the connecting wire 130 and make close contact with the internal conductor without striping off the insulation layers of the leads in advance or performing complicated soldering operations, which greatly simplifies the conductive connection steps and improves assembly efficiency. In addition, the mechanical engagement between the piercing portions and the conductor provides a stable physical connection, which effectively reduces contact resistance and enhances the anti-vibration loosening performance, ensures stable transmission of low voltage and current, significantly improves the reliability and long-term durability of the conductive connection, and at the same time avoids the poor contact problems that may occur in traditional plug-in methods. Further, in some embodiments of the present disclosure, two linearly spaced limiting slots are provided in the lamp holder 210, and the first conductive member 211 and the second conductive member 212 are fixedly installed in the corresponding limiting slot, respectively, that is, the lamp holder 210 is provided with a first limiting slot 2101 and a second limiting slot 2102, the first conductive member 211 is fixedly inserted in the first limiting slot 2101, and the second conductive member 212 is fixedly inserted in the second limiting slot 2102, thereby achieving precise positioning and firm fixation of the first conductive member 211 and the second conductive member 212, and preventing the first conductive member 211 and the second conductive member 212 from being in misaligned contact with the disconnecting holes 1301 or the connecting wire 130 due to being displaced or deflected during use. In addition, the structures of the limiting slots ensure that the first conductive member 211 and the second conductive member 212 are strictly spaced and always correspond to the ideal position on both sides of the respective disconnecting hole 1301, which ensures the accuracy and consistency of the conductive path, improves the stability and reliability of the electrical connection, and at the same time simplifies the assembly process of the light-emitting assemblies 200 and enhances the mechanical stability of the overall structure. In one embodiment, the piercing portions are arrow-shaped, and an outer surface of each limiting slot abuts against a surface of a corresponding piercing portion that faces away from the connecting wire 130, to prevent the connecting wire 130 from shifting due to the reaction force received when piercing.

Referring to FIGS. 1, 3, 4 and 6 again, in some embodiments of the present disclosure, the lamp holder 210 is connected to a pressing cover 300 on one side away from the lamp base 220. After the first conductive member 211 and the second conductive member 212 pierce the connecting wire 130, the pressing cover 300 may apply uniform pressure to the wire group 100, which further ensures close contact between the conductive members and the connecting wire 130 and enhances the mechanical stability of the electrical connection. It is easy to understand that the compression effect effectively compensates for the loose contact possibly caused by thermal expansion and contraction of the material, vibration or external force, continuously maintains the low-resistance conduction state, significantly reduces the flickering, circuit breakage or heating problems caused by poor contact, extends the service life of the light string and improves the safety of use. In one embodiment, the pressing cover 300 and the lamp holder 210 are engaged via a snap-fit connection, which achieves the quick installation and disassembly of the pressing cover 300. The fixing operation of the pressing cover 300 may be completed without using additional tools, thereby simplifying the installation and maintenance process of the light string. In this regard, the clamping structure ensures the convenience of operation while providing sufficient pressing force. The user may easily close and open the pressing cover 300 by pressing or rotating the buckle, which is convenient for quickly re-pressing or replacing the light-emitting assemblies 200 when the conductive members are in poor contact, thereby improving the user experience and the maintainability of the light string, while maintaining the stability and sealing of the structure. For example, referring to FIGS. 4 and 6 again, the lamp holder 210 is provided with a clamping slot 2103, the pressing cover 300 is provided with a clamping portion 310, and the clamping portion 310 may be inserted into the clamping slot 2103 and clamped with the clamping slot 2103. Further, in some embodiments of the present disclosure, an opening portion 320 is provided on the pressing cover 300, providing a convenient opening method for the user. The pressing cover 300 may be opened by manually holding or prying the opening portion 320 without requiring tools, thereby quickly releasing the pressing state and exposing the connection portion of the conductive members and the connecting wire 130. The design of the opening portion 320 solves the problem that the traditional clamping pressing cover 300 is difficult to open due to being buckled tightly. Especially when the conductive members need to be readjusted, inspected or replaced, the user may quickly perform operations and intuitively access the internal connection structure, which facilitates maintenance, troubleshooting or component replacement, thus significantly improving the maintainability and user-friendliness of the light string.

Figure 7:
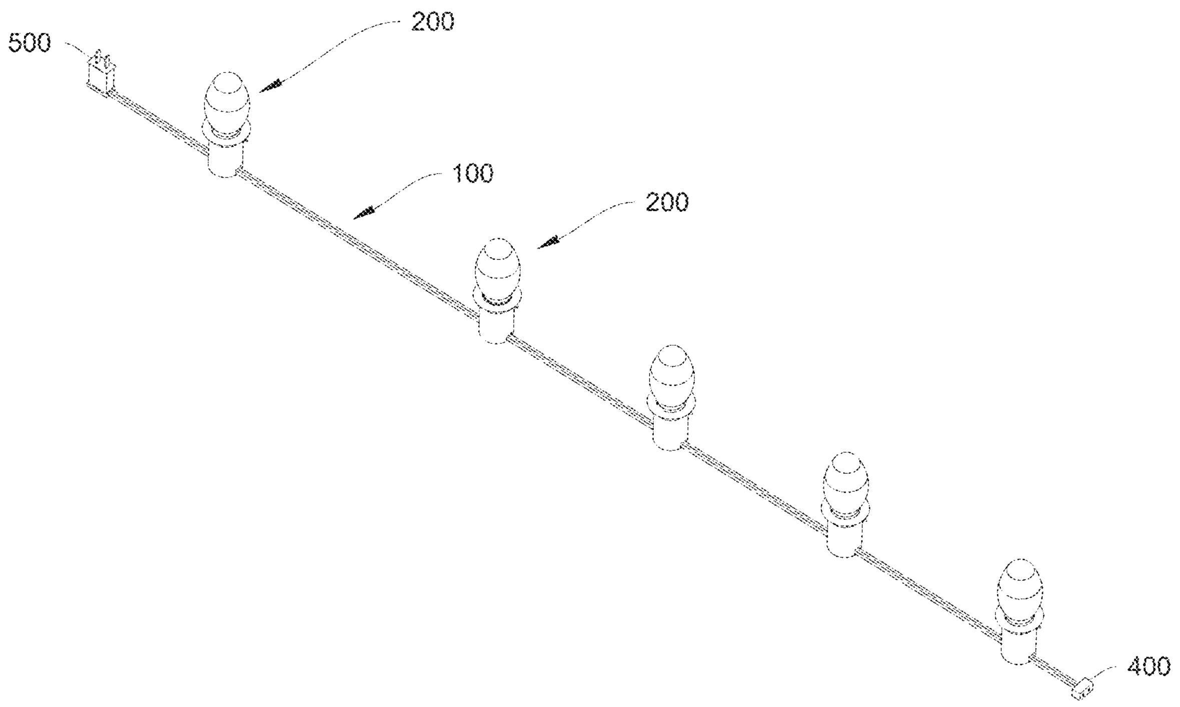
FIG. 7 is a schematic structural diagram of a light string having a serial-type light string according to an embodiment of the present disclosure.

Referring to FIG. 7 again, in some embodiments of the present disclosure, a serial-type light string includes a continuation seat 400, the wire group 100 is provided in a plurality, and the plurality of wire groups 100 are connected and in conduction through the continuation seat 400, which achieves reliable electrical connection and conduction between the plurality of independent wire groups 100, such that the light string may be seamlessly spliced into a whole of any length through the continuation seat 400, thus resolving the problem that traditional light strings cannot cover large-area scenarios due to the length limitation of a single wire group 100. The continuation seat 400 maintains the continuity and stability of the conductivity among various wire groups 100, to ensure that the series voltage-dividing effect is not affected by the splicing of the wire groups 100. Users may flexibly combine the lengths of the wire groups 100 according to actual needs, to achieve infinite continuation and elongation of the light string, thus expanding the application range and scenario adaptability of the light string while maintaining the consistency and reliability of the overall electrical performance. For example, for the first section of the wire group 100, one end of the wire group 100 may be connected to a power supply plug 500, and the other end is connected to the continuation seat 400. For the middle section of the wire group 100, both ends of the wire group100 may be connected to the continuation seat 400, respectively. For the tail section of the wire group 100, one end of the wire group 100 is connected to the continuation seat 400, and the other end is a closed structure. In one embodiment, the positive wire 110, the connecting wire 130 and the negative wire 120 are arranged in sequence in the wire group 100. This orderly lead layout optimizes the spatial structure inside the wire group 100, reduces cross-interference and electromagnetic coupling between the leads, and reduces the risk of signal interference or short circuit. In addition, the central arrangement of the connecting wire 130 facilitates better concealment after the piercing portions are inserted.

Referring to FIG. 7 again, the light string according to the embodiment of the present disclosure includes a serial-type light string according to the embodiment of the present disclosure. By adopting the serial-type light string in the embodiment of the present disclosure, efficient series voltage-dividing power supply for low-voltage LED bulbs, infinite continuation and elongation of the multi-section wire group 100, stable and reliable conductive connection, and convenient installation and maintenance may be achieved. The adaptability to low-power scenarios, long-distance layout flexibility, user-friendliness and long-term use reliability are taken into account, the technical bottlenecks of traditional light strings in low-voltage power supply, complex connection structure and maintenance cost are solved, and the comprehensive performance, application range and market competitiveness of the light string are significantly improved.

Other compositions and operations for the light strip in the embodiments of the present disclosure are known by those of ordinary skill in the art, and detailed descriptions are not made here.

Figure 8:
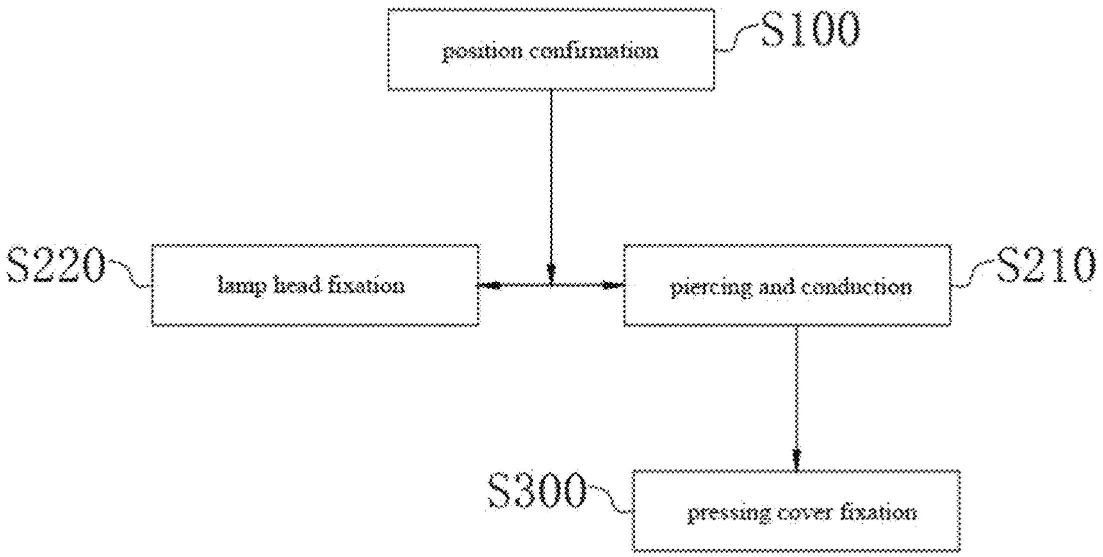
FIG. 8 is a flow chart of an installation method applied to a serial-type light string according to an embodiment of the present disclosure.

Referring to FIG. 8 again, an installation method according to an embodiment of the present disclosure is applied to the serial-type light string according to an embodiment of the present disclosure, and the installation method includes the following steps.

In a step of S100: position confirmation: the wire group 100 is taken, and a plurality of disconnecting holes 1301 are drilled in the connecting wire 130 according to preset light-emitting positions.

In a step of S210: piercing and conduction: after the position confirmation, a plurality of light-emitting assemblies 200 are taken to be arranged in one-to-one correspondence with the disconnecting holes 1301, and the first conductive member 211 and the second conductive member 212 of each light-emitting assembly 200 are inserted into the connecting wire 130 on both sides of the respective disconnecting hole 1301, such that the first conductive member 211 and the second conductive member 212 are electrically and separately in conduction with the positive wire 110 and the negative wire 120.

In a step of S220: lamp base 220 fixation: before or after the piercing and conduction, the lamp base 220 is mounted on the lamp holder 210 to be electrically in conduction with the first conductive member 211 and the second conductive member 212.

In a step of S300: pressing cover 300 fixation: after the piercing and conduction, the pressing cover 300 is clamped on one side of the lamp holder 210 away from the lamp base 220, and mechanical pressure causes the first conductive member 211 and the second conductive member 212 to be pressed against the wire group 100.

According to the installation method in the embodiment of the present disclosure, through the systematic steps of position confirmation, piercing and conduction, lamp base 220 fixation and pressing cover 300 fixation, efficient and reliable installation of the light string is achieved. In application, the disconnecting holes 1301 are first accurately drilled according to the preset light-emitting positions, to ensure the accuracy of the conductive connection position, and then the first conductive member 211 and the second conductive member 212 of the light-emitting assemblies 200 are directly inserted into the connecting wire 130 on both sides of the respective disconnecting hole 1301 to achieve electrical conduction, which simplifies the traditional soldering or complex plug-in process. In addition, the lamp base 220 is in conduction with the conductive members through a threaded connection, which ensures the stable power supply of the light-emitting source 230, and finally the mechanical stability of the conductive connection is further enhanced by clamping and fixing with the pressing cover 300. The overall operation is simple, and both installation efficiency and connection reliability are taken into account, so the installation method is particularly suitable for the rapid deployment and maintenance of the light string in a low-voltage environment, thus improving the user experience and the engineering applicability of the light string.

Other compositions and operations for the installation method in the embodiments of the present disclosure are known by those of ordinary skill in the art, and detailed descriptions are not made here.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A serial-type light string, comprising:

a wire group, comprising a positive wire, a negative wire and a connecting wire, wherein two ends of the connecting wire are respectively in conduction with the positive wire and the negative wire, and the connecting wire is provided with a plurality of disconnecting holes; and a plurality of light-emitting assemblies, connected to the wire group and arranged in one-to-one correspondence with the disconnecting holes, wherein each of the light-emitting assemblies comprises a lamp holder and a lamp base, the lamp holder is provided with a first conductive member and a second conductive member that are arranged spaced apart in a circumferential direction of the lamp holder, one end of each of the first conductive member and the second conductive member is disposed within the lamp holder to be in conduction with the lamp base, and another end of each of the first conductive member and the second conductive member protrudes from the lamp holder;

wherein the first conductive member and the second conductive member are located respectively on opposite sides of the respective disconnecting hole, and ends of the first conductive member and the second conductive member away from the lamp base are configured to be inserted into the connecting wire and in conduction with the connecting wire.

2. The serial-type light string according to claim 1, wherein:

the lamp base is provided with an insulating post, a first conductive ring, and a second conductive ring;

the first conductive ring and the second conductive ring are arranged spaced apart in an axial direction of the insulating post; and the insulating post is threadedly connected to the lamp holder, to cause the first conductive ring to contact and be in conduction with the first conductive member, and to cause the second conductive ring to contact and be in conduction with the second conductive member.

3. The serial-type light string according to claim 2, wherein:

the first conductive ring is located at a bottom of the insulating post, the second conductive ring is located at a top of the insulating post, an outer diameter of the first conductive ring is smaller than an outer diameter of the second conductive ring, the first conductive member and the second conductive member are both strip-shaped and arranged in parallel, the first conductive member abuts against and is in conduction with an outer wall of the first conductive ring, and the second conductive member abuts against and is in conduction with an outer wall of the second conductive ring.

4. The serial-type light string according to claim 2, wherein:

the lamp base is provided with a light-emitting source, the light-emitting source is connected to a positive lead wire and a negative lead wire, the insulating post is provided with a first wire duct and a second wire duct, the positive lead wire is threaded through the first wire duct, to be connected to the first conductive ring, and the negative lead wire is threaded through the second wire duct, to be connected to the second conductive ring.

5. The serial-type light string according to claim 1, wherein the positive wire, the connecting wire and the negative wire are arranged in sequence.

6. The serial-type light string according to claim 1, wherein the first conductive member and the second conductive member are both provided with piercing portions at ends away from the lamp base, to pierce the connecting wire.

7. The serial-type light string according to claim 1, wherein the lamp holder is connected to a pressing cover on one side away from the lamp base, to cause the first conductive member and the second conductive member to be pressed against the wire group.

8. The serial-type light string according to claim 7, wherein the pressing cover is snap-fitted with the lamp holder.

9. The serial-type light string according to claim 1, wherein the serial-type light string further comprises a continuation seat, the wire group is provided in a plurality, and the plurality of wire groups are connected and in conduction through the continuation seat.

10. An installation method, wherein the installation method is applied to the serial-type light string according to claim 7, and the installation method comprises following steps:

confirming positions: taking the wire group, and drilling a plurality of disconnecting holes in the connecting wire according to preset light-emitting positions;

piercing and conducting: after the confirming positions, taking and arranging a plurality of light-emitting assemblies in one-to-one correspondence with the disconnecting holes, and inserting the first conductive member and the second conductive member of each light-emitting assembly into the connecting wire on both sides of the respective disconnecting hole, such that the first conductive member and the second conductive member are electrically and separately in conduction with the positive wire and the negative wire;

fixing the lamp base: before or after the piercing and conducting, mounting the lamp base on the lamp holder to cause the lamp base to be electrically in conduction with the first conductive member and the second conductive member; and fixing the pressing cover: after the piercing and conducting, clamping the pressing cover on one side of the lamp holder away from the lamp base, and causing, by mechanical pressure, the first conductive member and the second conductive member to be pressed against the wire group.

* * * * *